United States Patent
Liberto et al.

(10) Patent No.: US 8,068,981 B2
(45) Date of Patent: Nov. 29, 2011

(54) OFF-BOARD NAVIGATION SYSTEM FOR VEHICLES

(75) Inventors: Carlo Liberto, Orbassano (IT); Francesco Lilli, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 561 days.

(21) Appl. No.: 11/806,011

(22) Filed: May 29, 2007

(65) Prior Publication Data

US 2007/0299600 A1 Dec. 27, 2007

(30) Foreign Application Priority Data

May 26, 2006 (EP) .................................... 06114568

(51) Int. Cl.
*G01C 21/30* (2006.01)
*G08G 1/123* (2006.01)

(52) U.S. Cl. .................... 701/209; 701/202; 340/995.19; 340/993

(58) Field of Classification Search .......... 701/117–119, 701/200, 201, 202, 204, 207–218, 220–226; 342/357.06, 357.13; 709/219, 242, 244; 340/995.13, 995.19; 348/211.3
See application file for complete search history.

(56) References Cited

U.S. PATENT DOCUMENTS

| | | | | |
|---|---|---|---|---|
| 5,818,356 A | * | 10/1998 | Schuessler | 340/995.12 |
| 5,839,086 A | * | 11/1998 | Hirano | 701/201 |
| 6,111,521 A | * | 8/2000 | Mulder et al. | 340/905 |
| 6,438,561 B1 | * | 8/2002 | Israni et al. | 707/104.1 |
| 6,741,931 B1 | | 5/2004 | Kohut et al. | |
| 2003/0060977 A1 | | 3/2003 | Jijina et al. | |
| 2004/0220729 A1 | * | 11/2004 | Park et al. | 701/209 |
| 2005/0021227 A1 | * | 1/2005 | Matsumoto et al. | 701/207 |
| 2005/0222763 A1 | * | 10/2005 | Uyeki | 701/210 |
| 2005/0248470 A1 | * | 11/2005 | Berthe | 340/961 |
| 2006/0031007 A1 | * | 2/2006 | Agnew et al. | 701/204 |

FOREIGN PATENT DOCUMENTS

| | | |
|---|---|---|
| EP | 1528361 | 5/2005 |
| GB | 2389679 | 12/2003 |

OTHER PUBLICATIONS

European Search Report mailed Sep. 14, 2006 in corresponding European Application No. 06114568.6.

\* cited by examiner

*Primary Examiner* — Mary Cheung
*Assistant Examiner* — Muhammad Shafi
(74) *Attorney, Agent, or Firm* — Davidson Berquist Jackson & Gowdey, LLP

(57) ABSTRACT

Described herein is an off-board navigation system for vehicles, comprising at least one operating center and at least one on-board navigation unit installed on board a vehicle, in which the operating center is provided with monitoring means configured for detecting events that modify the road conditions of stretches of road forming part of a road network, and processing means designed to determine, following upon detection of an event, whether said event has occurred on a stretch of road forming part of a route supplied to a user and, in this case, to request an alternative route and determine a point of no return (PNR) that is set along the route supplied to a user and beyond which the vehicle is no longer able to avoid the event and a point of influence (AR), in which the practicability of the route starts to be affected by the onset of the event and beyond which the user is still in time to request and receive an alternative route that will enable him to avoid the event in the case where the point of no return (PNR) has not yet been exceeded.

21 Claims, 3 Drawing Sheets

OFF-BOARD NAVIGATION SYSTEM FOR VEHICLES

Figure 1:
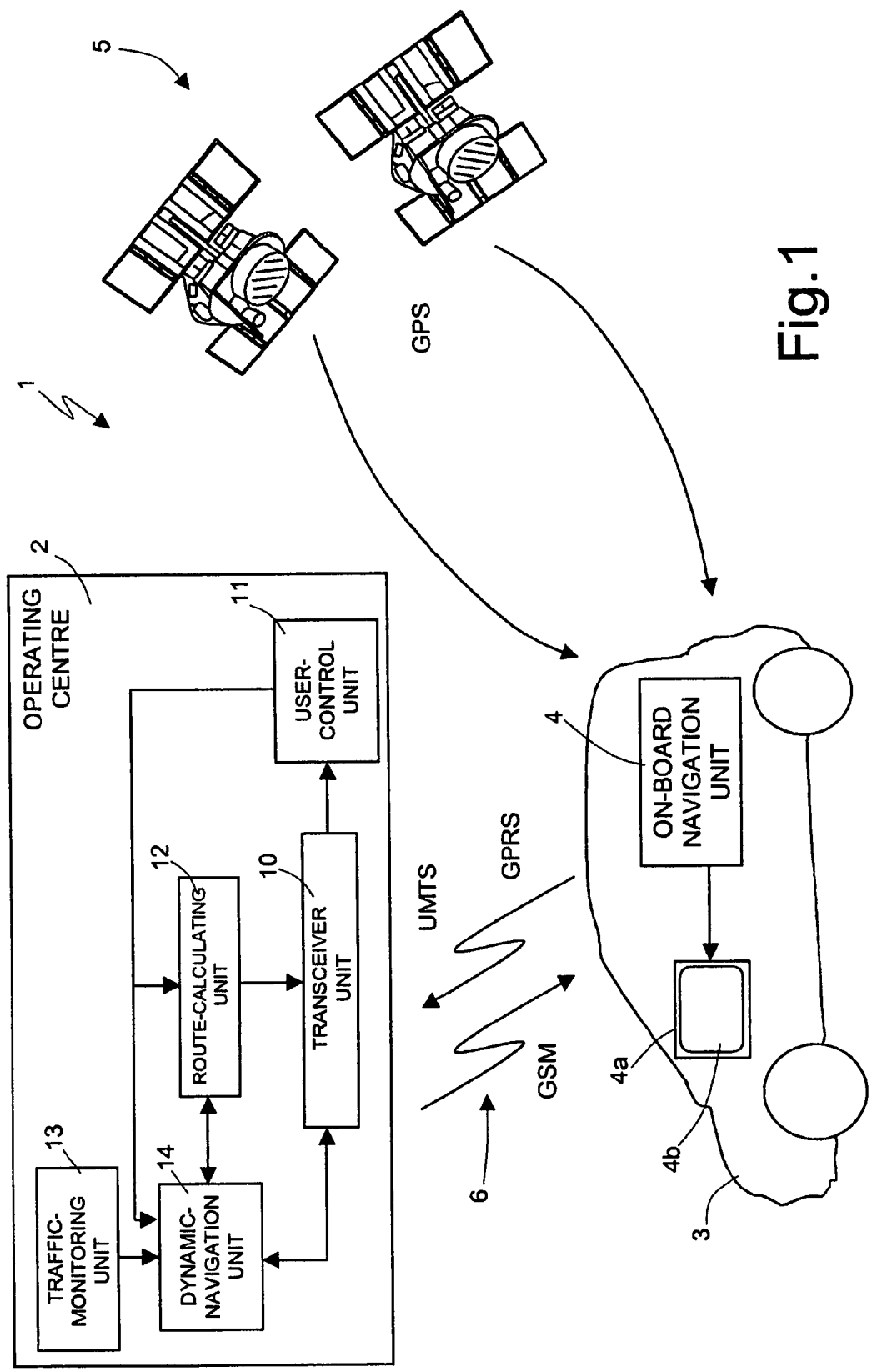

The present invention relates to an off-board navigation system for vehicles.

As is known, navigation systems for vehicles have the primary function of supplying the driver of the vehicle with a set of information of a graphic and/or vocal type on a route to follow in order to reach a selectable destination in an optimal way.

The above systems are basically made up of: a unit for receiving radio signals coming from satellites forming part of a satellite positioning system, for example GPS, or coming from emitter devices located in the area around the vehicle; a calculating unit, which calculates the position of the vehicle on the basis of the signal received from the satellite positioning system; and a user interface, which has the main task of supplying the driver of the vehicle with information of a graphic and/or vocal nature on the route. The user interface is used in the off-board navigation system for entry of the data necessary for calculating the route.

Amongst the navigation systems offered by the main automobile manufacturers, navigation systems of an on-board type are known, in which calculation of the route requested by the user is made directly on board the vehicle by a purposely provided calculating unit, and navigation systems of an off-board type, in which the calculation of the route requested by the user is carried out outside the vehicle.

In particular, in off-board navigation systems the calculation of the route comprised between the current position of the vehicle and the destination that the user wishes to reach is performed by an operating centre in communication with the vehicle and is transmitted by the latter to the navigation system integrated on board the vehicle, which receives the data calculated by the operating centre and supplies the driver with the graphic and/or vocal instructions on the route to follow.

The main advantage of off-board navigation systems is to achieve an essential simplification of the navigation system integrated on board the vehicle in so far as, thanks to a structure of a "hybrid" type, the calculating unit of the on-board navigation system just calculates the position of the vehicle but does not implement the algorithms necessary for the calculation of the routes, nor does it require all the data-support units necessary for storage of the cartographic maps.

It is clear how in this way a considerable reduction in the costs of construction of the on-board navigation system is achieved.

Another advantage of off-board navigation systems consists in the fact that updating of the information of a geographical nature used for calculating the routes requested by the user is made at the appropriate rate directly by the operating centre, thus exempting the user from this task. This guarantees the supply of a constantly efficient service, the reliability of which is not affected by possible errors deriving from the lack of updating of the information of a geographical character by the user.

Currently, navigation systems for vehicles constitute a commercial product that is undergoing a marked growth both on account of the need, on the part of automobile manufacturers, to mark themselves off from one another in the offer of vehicles equipped with technological systems that are increasingly advanced, and on account of the new requirements of mobility of drivers, who move around in scenarios that are increasingly complex and require an increasingly larger amount of different information. This has led to the development of navigation systems of a "dynamic" type, which do not simply supply the driver of the vehicle with a set of instructions on how to reach a pre-set destination but which are also able to supply the user with additional information, such as, for instance, information on traffic or on points of particular interest along the route being covered.

The German patent application No. DE 101 05 449, for example, describes a navigation system for vehicles and a method of updating the data regarding a road route stored in said navigation system and, in particular, in an off-board navigation system, in which the information on the route is updated by an operating centre in the case where the driver of the vehicle signals to the operating centre the occurrence of an event that causes a variation in the traffic conditions present on the pre-chosen route. Following upon said signalling made by the user, the operating centre calculates an alternative route and sends it to the navigation system on board the vehicle.

The aim of the present invention is to provide a system and a method of off-board navigation that will further improve known navigation systems.

Figure 2A:
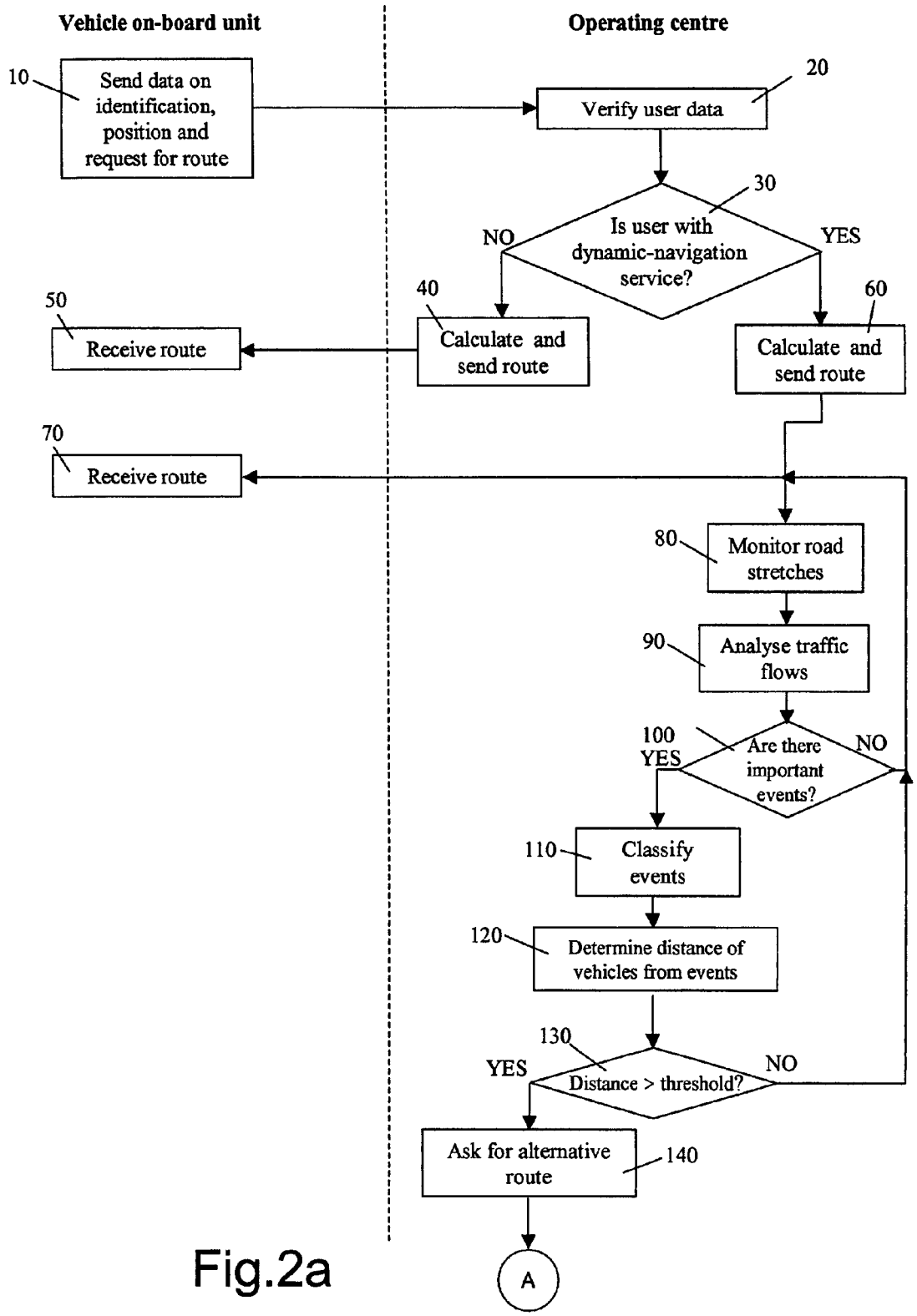
Figure 2B:
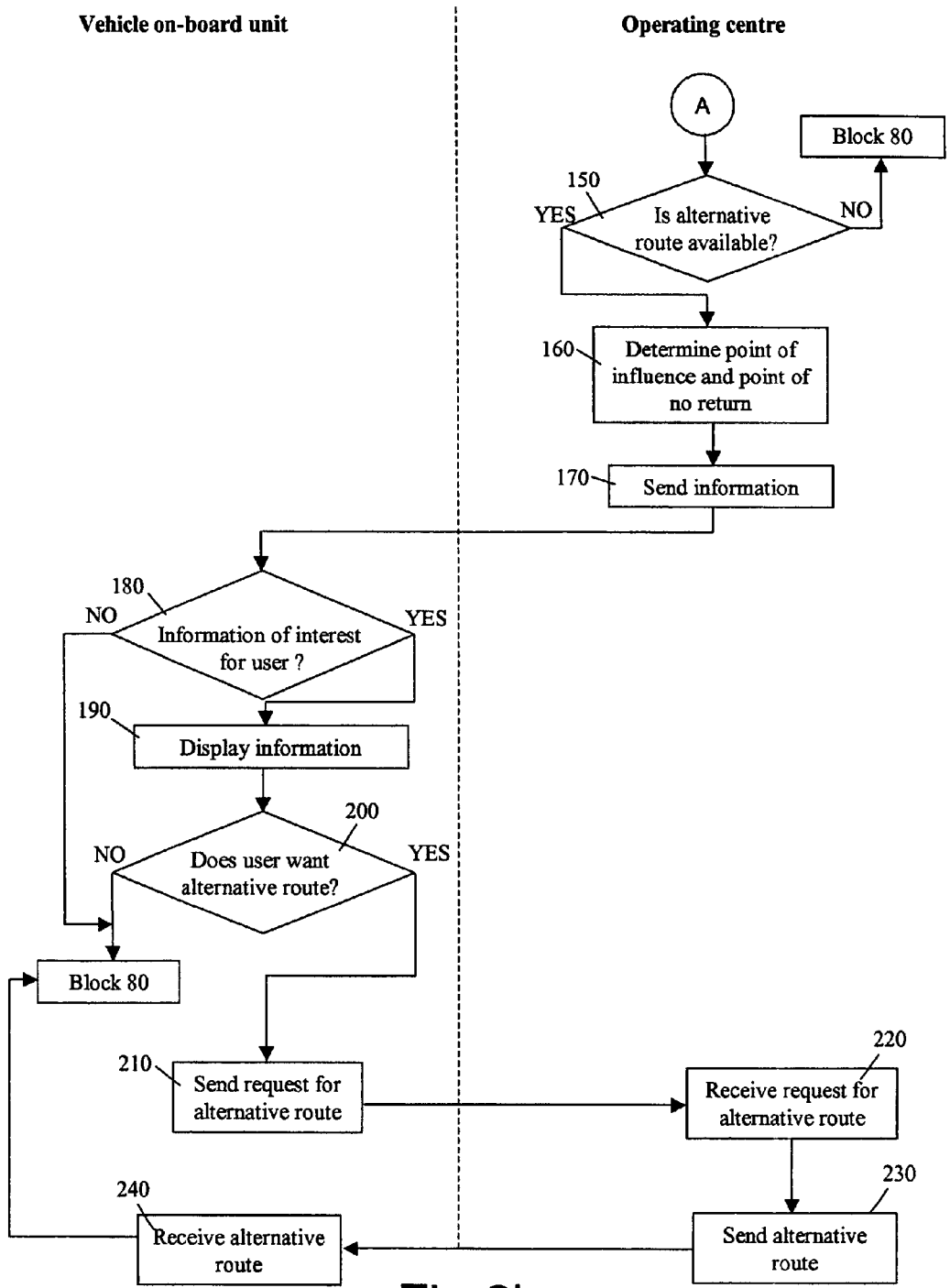

For a better understanding of the present invention a preferred embodiment thereof is now described, purely by way of non-limiting example, with reference to the attached plate of drawings, wherein:

FIG. 1 illustrates an off-board navigation system forming the subject of the present invention; and FIGS. 2a and 2b show a flowchart of the method implemented by the off-board navigation system of the present invention.

As illustrated in FIG. 1, the off-board navigation system 1 forming the subject of the present invention comprises: at least one operating centre 2, an on-board navigation unit 4, installed on board a vehicle 3; a satellite positioning system 5 of a known type, for example GPS, which co-operates with the on-board navigation unit 4; and a bi-directional mobile communication network 6 of a known type, for example GSM, GPRS or UMTS, located between the operating centre 2 and the vehicle 3.

The vehicle 3 of FIG. 1 is moreover provided with sensors of a known type (not illustrated in the figure), which are connected to the on-board navigation unit 4 and supply at output signals indicating the speed and direction of travel of the vehicle 3, for example an odometer and a gyroscope.

In particular, once again with reference to FIG. 1, the on-board navigation unit 4 is provided with means of a known type (not shown in the figure) for transmission and reception of radio signals, which enable a bi-directional data exchange with the operating centre 2 through the mobile communication network 6 and through which the on-board navigation unit 4 transmits to the operating centre 2 its own position, an identification code of its own, for example a serial number assigned thereto in the fabrication step, and the request for a route.

In order to be able to determine the position of the vehicle 3, the on-board navigation unit 4 is provided with means for receiving radio signals (not shown in the figure) transmitted by the GPS satellite positioning system 5 and is configured for calculating the current position of the vehicle on the basis of the aforesaid signals coming from the GPS satellite positioning system 5.

The on-board navigation unit 4 is able to calculate the position of the vehicle even in the case where the vehicle is located in areas not reached by the signals coming from the GPS satellite positioning system. For this purpose, the on-board navigation unit 4 is configured for implementing a known algorithm of the dead-reckoning type, which calculates the position of the vehicle 3 on the basis of the speed and direction of travel of the vehicle 3, supplied to the on-board navigation unit 4 by the signals coming from the odometer and the gyroscope, and on the basis of the last position calculated according to the signals coming from the GPS satellite positioning system.

In particular, the on-board navigation unit 4 comprises at least one user interface 4a (illustrated schematically) provided with a display 4b, which enables the user to perform all the operations necessary for use of the off-board navigation system 1.

For example, the user can enter the data of a target destination or else enter commands (detailed hereinafter) for communication with the operating centre 2. Said data and said commands are issued according to the usual modalities envisaged in the sector, for example by the use of a graphic interface and a pull-down menu presented on the display 4b.

Once again with reference to FIG. 1, the operating centre 2 comprises:

transceiver unit 10 for transmitting and receiving radio signals for bi-directional data transmission between the operating centre 2 and the on-board navigation unit 4;

a user control unit 11, stored in which is at least one data base containing information on the identity of the users of the off-board navigation system 1 and the type of service to which they have subscribed and which is configured for handling the information on users;

a route-calculating unit 12, stored in which is at least one data base containing information of a cartographic nature regarding a plurality of routes present on the territory and which has the task of calculating road routes following upon a request coming from the navigation unit 4;

a monitoring system 13 of a known type, which constantly monitors (by means of techniques of a known type) the traffic and road conditions of the road network of a portion of territory, for example in relation to the freedom of access to road routes, the weather conditions, possible road-works in progress, or the conditions of the road surface; and a dynamic-navigation electronic unit 14, configured for controlling the incidence of information regarding traffic and road conditions of the network on the road routes currently being covered by the users.

In particular, the user control unit 11 co-operates with the transceiver means 10, with the route-calculating unit 12, and with the dynamic-navigation unit 14 and is configured for receiving, through the transceiver unit 10, the identification code of the on-board navigation unit 4 on the basis of which the user control unit 11 identifies the vehicle 3 and the type of service subscribed to by the user of the vehicle 3.

FIGS. 2a and 2b show a flowchart of the method implemented by the off-board navigation system of the present invention.

According to the method implemented by the off-board navigation system of the present invention, when a user requires information regarding a new route, he enters, through the user interface 4a of the on-board navigation unit 4, the target destination and the type of route that he wishes to cover, for example upon the basis of the time of travel or upon the basis of the costs, and sends the request, together with the current position of the vehicle and his identification data, to the operating centre 2, through the mobile network 6 (block 10).

When the operating centre 2 receives the request coming from the user, it verifies first of all, via the user control unit 11, whether the user is enabled to receive the services offered by the operating centre 2. If it is not, no service is provided; otherwise (user enabled) the user control unit 11 verifies what type of service can be received by the user (block 30).

The off-board navigation system of the invention envisages in fact provision of different types of services that depend upon the type of contract signed by the user who uses the navigation system 1 of the invention.

In a first type of service, for example, the operating centre 2 simply calculates the route requested by the user and sends it to the on-board navigation unit 4 (output NO from block 30 and from blocks 40, 50 and 70), whereas, in the case where the user is enabled to receive a navigation service of a dynamic type (output YES from block 30), the route-calculating unit 12 of the operating centre 2 calculates the best possible route and sends the information regarding the route calculated both to the on-board navigation unit 4 (block 60) and to the dynamic-navigation unit 14, which stores it.

Simultaneously, the monitoring unit 13 monitors the traffic and road conditions of the individual stretches of the road network (block 80) and analyses the traffic flows in order to determine events that affect the degree of practicability of each stretch of road (block 90).

For the above purpose, the monitoring unit 13 receives, regularly and at pre-set time intervals, for example every 5 minutes, updated information regarding the traffic flows of the individual stretches of road, analyses the traffic flows that affect the practicability of the stretches of road and, on the basis of the aforesaid analysis, determines, for each stretch of road and in a way in itself known, the current speed required for traversing the stretch of road, compares the current speed required for traversing each stretch of road with a pre-set reference speed, the latter determined for example in optimal conditions of practicability of the stretch of road and, on the basis of the outcome of said comparison, then determines possible events (and the associated location, for example, an accident and its location) that affect the degree of practicability of the stretches of road (block 100).

In the case where events of the above sort are detected (output YES from block 100), the monitoring unit 13 stores the stretches of road in which the events have occurred and attributes to each event detected a first weight that indicates how much it affects the degree of practicability of the stretch of road on which it has occurred, for example "serious", "medium", or "negligible", and a second weight that indicates the probable evolution thereof, for example, "worsening", "stationary", or "improving" (block 110).

In particular, the second weight is determined by the monitoring unit 13 as a function of the first weight attributed to the event in the previous calculation session, i.e., the one made by the monitoring unit 13 on the basis of the information regarding the traffic flows that has arrived in the previous time interval.

The monitoring unit 13 then sends to the dynamic-navigation unit 14 the information regarding the stretches of road in which the events have occurred, as well as the events with their respective weights.

The dynamic-navigation unit 14 receives the aforesaid information and estimates the current position of each vehicle enabled to receive the dynamic-navigation service on the basis of the initial position of the vehicle at the moment of request for the route, on the basis of the time that has elapsed since the request for the route was sent, as well as on the basis of possible updating of the position of the vehicle, for example in the case where the vehicle has stopped in a car park, if the vehicle is enabled to transmit also said type of information to the operating centre.

On the basis of the estimated position, the information regarding the events associated to the different stretches, and the information regarding the route of each vehicle supplied by the route-calculating unit 12, the dynamic-navigation unit 14 then selects all the stretches of road, on which the events have occurred, that belong to the routes of the vehicles enabled to receive the dynamic-navigation service that have not yet reached the place in which the event has occurred.

In particular (block 120), the dynamic-navigation unit 14 defines a time window, for example of 5 minutes and searches, for each vehicle, events of a "serious" or "medium" type from which the vehicle is at a temporal distance of at least 5 minutes.

Simultaneously (block 120), the dynamic-navigation unit 14 searches for and stores the event of a "negligible" type closest to the estimated position of the vehicle and such that the sum of the delays of the stretches of road lying between the position of the vehicle and the event of a "negligible" type is greater than a pre-set time, for example, 10 minutes. The dynamic-navigation unit 14 then estimates, on the basis of the estimated position of the vehicle (block 120), the real distance of the vehicle, for example in metres or kilometres, from each "serious" and "medium" event that is located at a temporal distance of at least 5 minutes from the vehicle and compares (block 130) the real distance estimated with a pre-set threshold value. In the case where the real distance of the vehicle from the aforesaid events is greater than the aforesaid threshold (output YES from block 130), the dynamic-navigation unit 14 performs the following operations:

it verifies whether there has been a significant variation in the temporal distance previously estimated that separates the vehicle from the event;

it asks the route-calculating unit 12 to calculate once again the route supplied to the user assuming, however, as starting position of the vehicle, the estimated current position (block 140) and taking into account the information regarding the events as well as information regarding weights associated to the stretches of road, and, in the case where the route-calculating unit 12 supplies to the dynamic-navigation unit 14 the same route already supplied previously to the user, i.e., it has not been able to calculate an alternative route that avoids the event, (output NO from block 150) then the procedure is interrupted and from the block 150 returns to block 80 for monitoring the stretches of road, whereas, in the case where the route-calculating unit 12 supplies to the dynamic-navigation unit 14 a route different from the one previously supplied to the user that enables the event to be avoided, then the dynamic-navigation unit 14 determines:

a point of influence AR, which is located along the route covered by the vehicle upstream of the traffic event and defines the start of the area of influence of the event on the practicability of the route and which is determined by the dynamic-navigation unit 14 on the basis of a pre-set time $t_{est}$ of extinction of the event, which depends upon the seriousness of the event itself, for example 10, 20 or 30 minutes. The point of influence AR is important above all for those vehicles that have already passed beyond said point and the time of travel of the route of which starts to be affected by the event itself and that are still in time to receive an alternative route, whereas all the vehicles that have not yet reached said point of influence are still sufficiently distant from the event so that there still exists the possibility for the event to be extinguished even before it starts to affect the times of travel of said vehicles; and a point of no return PNR, which corresponds to the point beyond which any deviations from the route of navigation are no longer possible and beyond which the vehicle is no longer able to avoid the traffic event ("serious" or "medium") that has occurred along its route (block 160).

In particular, the point of influence AR calculated by the dynamic-navigation unit 14 corresponds to a distance d that a vehicle would cover in the time $t_{est}$ of extinction of the event if it were to follow the route in the opposite direction starting from the position of the event and if it were to travel at a pre-set speed for covering the route.

In order to be able to determine the point of influence AR with greater precision, the dynamic-navigation unit 14 verifies the reliability of the pre-set extinction time $t_{est}$, analysing the degree of practicability of each stretch of road comprised in said portion of route.

For the above purpose, the dynamic-navigation unit 14 associates to each of the stretches of road comprised between the estimated position of the vehicle and the point in which the event has occurred a weight that indicates the evolution of the degree of practicability of the stretch of road with respect to a pre-set threshold value.

For example, in the case where at least half of the stretches of road presents a weight that indicates an improvement of the degree of practicability with respect to a pre-set threshold value, the time $t_{est}$ is halved by the dynamic-navigation unit 14 with respect to the pre-set initial value, and the point of influence AR is once again calculated on the basis of the new time $t_{est}$, whereas, in the case where at least half of the stretches of road presents a weight that indicates a worsening of the degree of practicability with respect to the threshold value, the time $t_{est}$ is doubled by the dynamic-navigation unit 14 with respect to the pre-set initial value, and the point of influence AR is once again calculated on the basis of the new time $t_{est}$. In all the other cases the point of influence AR remains the one calculated on the basis of the time $t_{est}$ initially pre-set.

In order to determine the point of no return PNR, the dynamic-navigation unit 14 asks the route-calculating unit 12 to calculate a number of times the route supplied to the user assuming, however, as starting position of the vehicle, for each calculation session, a point that is at a temporal distance from the pre-set "serious" or "medium" event, for example, 2 minutes, 6 minutes, 10 minutes, etc., following the route originally supplied to the user in the opposite direction, until the new route calculated presents a deviation from the original route.

In any case, the maximum temporal distance that the supposed starting position of the vehicle can assume cannot exceed the value of the temporal distance for the estimated position of the vehicle.

The point of no return will therefore be the minimum distance from the traffic event in which the new route calculated presents a deviation with respect to the original route supplied to the user and in which it is still possible to supply to the user an alternative route that enables him to avoid the event.

Once the point of influence AR and the point of no return PNR have been calculated, the dynamic-navigation unit 14 processes and sends to the on-board navigation unit 4 (block 170) a message containing:

information regarding the type of event, for example accident, heavy traffic, road-works in progress, etc.;
the geo-referenced position of the event;
the availability of an alternative route;
the point of influence AR; and
the point of no return.

The aforesaid message is then received by the on-board navigation unit 4 (block 180), which analyses it in order to evaluate whether the information received is of interest to the user.

In particular, the on-board navigation unit 4 verifies on the basis of the current position of the vehicle whether the vehicle has already exceeded the point of influence AR and/or the point of no return PNR and, on the basis of said verification, decides whether to display a message for the user and, if it does decide to display a message, selects the type of message to be displayed.

In the case where the vehicle has not yet exceeded the point of influence AR or has already exceeded the point of no return PNR, the on-board navigation unit 4 could, for example, not display any message since, as has been mentioned previously, in the first case the vehicle is at a distance from the event such that there exists the possibility for the event extinguishing before the arrival of the vehicle, whilst in the second case the vehicle is no longer in time to avoid the event. In this case (output NO from block 180), the procedure returns to block 80.

In the case where the vehicle has already exceeded the point of influence AR but has not yet exceeded the point of no return PNR, the on-board navigation unit 4 could instead, for example, display a message that signals to the user the geo-referenced position of the event, the point of influence AR, the point of no return PNR, and the availability of an alternative route, (output YES from block 180 and block 190) in such a way that the user will be able to decide on the basis of the information received whether to request the alternative route or otherwise (block 200).

In the case where the user is interested in receiving the alternative route available (output YES from block 200), he sends, via the on-board navigation unit 4 (block 210), a request to the operating centre 2, which receives it (block 220) and sends to the user the alternative route (block 230), the representative data of which are received and represented by the on-board navigation unit 4 (block 240).

In the case where the user was not interested in receiving the alternative route (output NO from block 200) and does not send to the operating centre 2 any request for an alternative route, the procedure returns to block 80 for monitoring stretches of road, and the operating centre 2 does not send to the user any further signalling regarding the event already highlighted.

The subsequent signalling to the user of the availability of an alternative route by the operating centre 2 will occur upon onset of an event subsequent to the one signalled previously.

The off-board navigation system 1 of the invention can moreover envisage at least one operating mode that enables the user to signal to the operating centre 2 that he is not interested in receiving the alternative route that has been proposed to him.

Finally, it is clear that modifications and variations can be made to the system described and illustrated herein, without thereby departing from the sphere of protection of the present invention, as defined in the annexed claims.

The invention claimed is:

1. An off-board navigation system for vehicles, comprising:
    at least one off board operating center; and
    at least one on-board unit installed on board a vehicle and which communicates with said at least one off board operating center and can be used by a user for setting target destinations;
    said at least one off board operating center comprising:
        an off-board calculating unit, which receives a user request and is designed to calculate, in response, a route on the basis of the information regarding the position of said vehicle and on the basis of geographical data present in the off board operating center itself;
        an off-board transceiver unit configured to transmit said route to said on-board unit; and
        an off board monitoring system configured to monitor constantly the traffic and road conditions of a road network of a portion of territory and to detect traffic altering events that modify the road conditions of stretches of road forming part of said road network; and
        an off-board processing system configured to determine, upon detection of an event that alters traffic conditions, whether said traffic altering event has occurred on a stretch of road forming part of said route supplied to said user and, in this case, to determine a point of no return (PNR) that is set along said route which corresponds to that point on the route beyond which any deviations from the route are no longer possible and beyond which said vehicle is no longer able to avoid said traffic altering event; and a point of influence (AR) in which the amount of traffic congestion along said route starts to be affected by the onset of said traffic altering event and beyond which said user is still in time to request to and to receive from said operating center an alternative route designed to avoid said traffic altering event in the case where said point of no return (PNR) has not yet been exceeded, wherein the point of influence (AR) is determined on the basis of a distance (d) that said vehicle would cover in a time ($t_{est}$) of extinction of the traffic altering event if it were to cover said route in the opposite direction from the position of the traffic altering event and if it were to travel at a pre-set speed for covering said route; and communicates such determination and associated data to the on-board unit.

2. The system according to claim 1, in which said off board processing system is moreover configured for:
    estimating the current position of said vehicle;
    determining on the basis of the estimated current position of said vehicle a temporal distance of said vehicle from said traffic altering event; and
    verifying whether said temporal distance satisfies a pre-set relation with a pre-set threshold value.

3. The system according to claim 2, where said temporal distance satisfies said pre-set relation, said off board processing system is moreover configured for:
    determining on the basis of the estimated current position of said vehicle a spatial distance of said vehicle from said traffic altering event; and
    verifying whether said spatial distance satisfies a pre-set relation with a pre-set threshold value.

4. The system according to claim 3, where said spatial distance satisfies said pre-set relation, said off board processing system are moreover configured for:
    asking the route-calculating unit to calculate on the basis of said estimated current position a route alternative to said route supplied to the user, which enables said user to avoid said traffic altering event.

5. The system according to claim 4, in which said off board processing system is moreover configured for calculating said point of influence (AR) and said point of no return (PNR) in the case where said off board route-calculating unit is able to calculate an alternative route.

6. The system according to claim 1, in which said off board processing system is configured to divide the route into discrete stretches and for determining said distance (d) on the basis of the traffic altering event on each stretch of road forming part of a portion of said route comprised between the estimated position of said vehicle and the point in which said traffic altering event has occurred.

7. The system according to claim 6, in which said off board processing system is configured for associating to each of the stretches of road comprised between the estimated position of the vehicle and the point in which the traffic altering event has occurred a weight that indicates the evolution of the traffic altering event on the stretch of road with respect to a pre-set threshold value.

8. The system according to claim 7, in which said off board processing system is configured for modifying said time ($t_{est}$) of extinction of the traffic altering event on the basis of the evolution of the traffic altering event on said stretches of road.

9. The system according to claim 8, in which said off board processing system is configured for reducing said time ($t_{est}$) of extinction of the traffic altering event in the case where at least half of said stretches of road presents a weight that indicates an improvement of the traffic altering event with respect to a pre-set threshold value.

10. The system according to claim 9, in which said off board processing system is configured for calculating said distance (d) on the basis of said reduced time ($t_{est}$) of extinction of the traffic altering event.

11. The system according to claim 8, in which said off board processing system is configured for prolonging said time ($t_{est}$) of extinction of the traffic altering event in the case where at least half of said stretches of road presents a weight that indicates a worsening of the traffic altering event with respect to a pre-set threshold value.

12. The system according to claim 11, in which said off board processing system is configured for calculating said distance (d) on the basis of said prolonged time ($t_{est}$) of extinction of the traffic altering event.

13. The system according to claim 1, in which in order to determine said point of no return (PNR), said off board processing system is configured for:
calculating a new route, assuming as starting a position of the vehicle a point that is located at a pre-set temporal distance from said traffic altering event; and
repeating said step of calculation, displacing said starting position of the vehicle until said new route presents a deviation with respect to said route supplied to said user.

14. The system according to claim 1, in which said off board monitoring system is configured for determining a weight that indicates the degree of seriousness of said traffic altering event and said processing system is configured for determining said point of influence (AR) and said point of no return (PNR) in the case where said weight associated to said traffic altering event will exceed a pre-set threshold value.

15. The system according to claim 14, in which said off board processing system is configured for sending to said on-board unit a message containing:
information that signals the presence of said traffic altering event on said route supplied to the user and said weight of said event;
information that signals the geo-referenced position of said traffic altering event;
information that signals the availability of said alternative route;
information that signals said point of influence (AR); and
information that signals said point of no return (PNR).

16. The system according to claim 15, in which said on-board unit is configured for evaluating whether said information received is of interest to the user.

17. The system according to claim 15, in which said on-board unit is configured for:
verifying on the basis of the current position of the vehicle whether the vehicle has already exceeded said point of influence (AR) and/or said point of no return (PNR) and, on the basis of said verification,
deciding whether to display a message for the user.

18. The system according to claim 17, in which said on-board unit is configured for displaying a message containing:
information that signals the presence of said event on said route supplied to the user and said weight of said event;
information that signals the geo-referenced position of said event;
information that signals the availability of said alternative route;
information that signals said point of influence (AR); and
information that signals said point of no return (PNR);
in the case where the vehicle has exceeded the point of influence (AR) but has not yet exceeded the point of no return (PNR).

19. The system according to claim 1, in which said on-board unit is configured for sending to the operating center a request for said alternative route.

20. The system according to claim 1, wherein the point of no return (PNR) is determined by repeatedly calculating the route supplied to a user, assuming, for each calculation, a vehicle starting position which is at a progressively increasing temporal distance from the traffic altering event, back along the route originally supplied to the user, until the calculated route presents a deviation from the original route.

21. An off-board navigation system for vehicles, comprising:
an off board navigating and operating system; and
an on-board unit installed on board a vehicle which is in communication with the off board operating system and which can be used by a user for setting target destinations;
said off board navigating and operating system including:
an off board calculating unit that receives a user request and, in response, calculates a route on the basis of the information regarding the position of said vehicle and on the basis of geographical data present in the off board operating system itself;
an off board transceiver unit which transmits route data to said on-board unit; and
an off board monitoring system which constantly monitors the traffic and road conditions of a road network of a portion of territory and to detect events that modify the road conditions of stretches of road forming part of said road network; and
an off board processing system which, following detection of a traffic altering event that changes traffic conditions,
determines whether said traffic altering event has occurred on a stretch of road forming part of said route supplied to said user and, in this case, then
determines a point of no return (PNR) that is set along said route and beyond which said vehicle is no longer able to avoid said traffic altering event; and then
determines a point of influence (AR) in which the amount of traffic congestion along said route starts to be affected by the onset of said traffic altering event and beyond which said user is still in time to request to and to receive from said off board operating system an alternative route designed to avoid said traffic altering event in the case where said point of no return (PNR) has not yet been exceeded; and communicates such determinations and associated data to the vehicle on-board unit.

* * * * *